(12) United States Patent
Bridges et al.

(10) Patent No.: US 7,281,118 B2
(45) Date of Patent: Oct. 9, 2007

(54) SENDING THREAD MESSAGE GENERATED USING DCR COMMAND POINTED MESSAGE CONTROL BLOCK STORING MESSAGE AND RESPONSE MEMORY ADDRESS IN MULTIPROCESSOR

(75) Inventors: Jeffrey Todd Bridges, Raleigh, NC (US); Gordon Taylor Davis, Chapel Hill, NC (US); Thomas Andrew Sartorius, Raleigh, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 11/198,042

(22) Filed: Aug. 5, 2005

(65) Prior Publication Data

US 2007/0033303 A1 Feb. 8, 2007

(51) Int. Cl.
*G06F 15/167* (2006.01)
(52) U.S. Cl. .......................... 712/30; 712/34; 719/313
(58) Field of Classification Search ...................... None
See application file for complete search history.

(56) References Cited

U.S. PATENT DOCUMENTS 5,073,852 A * 12/1991 Siegel et al. ................ 719/313

| 5,634,127 A | 5/1997 | Cloud et al. |
| 5,768,515 A | 6/1998 | Choquier et al. |
| 5,870,540 A | 2/1999 | Wang et al. |
| 5,999,982 A | 12/1999 | Kishi et al. |
| 6,049,825 A | 4/2000 | Yamamoto |
| 6,256,724 B1 | 7/2001 | Hocevar et al. |
| 6,349,336 B1 | 2/2002 | Sit et al. |
| 6,415,332 B1 | 7/2002 | Tuel, Jr. |
| 6,587,899 B1 | 7/2003 | Jarvi et al. |
| 6,591,310 B1 | 7/2003 | Johnson |

* cited by examiner

*Primary Examiner*—Kenneth S. Kim
(74) *Attorney, Agent, or Firm*—Connolly Bove Lodge & Hutz LLP; Joscelyn G. Cockburn

(57) ABSTRACT

A method and system for messaging between processors and co-processors connected through a bus. The method permits a multi-thread system processor to request the services of a processor or co-processor located on the bus. Message control blocks are stored in a memory which identify the physical address of the target processor, as well as a memory location in the memory dedicated to the thread requesting the service. When the system processor requests service of a processor or co-processor, a DCR command is created pointing to the message control block. A message is built from information contained in the message control block or transferred to the processor or co-processor. The return address for the processor or co-processor message is concatenated with the thread number, so that the processor or co-processor can create a return message specifically identifying memory space dedicated to the requesting thread for storage of the response message.

17 Claims, 2 Drawing Sheets

| Word | Byte0 | Byte1 | Byte2 | Byte3 |
|---|---|---|---|---|
| 1 | MCB_Index(0:7) | Message_Tag(0:7) | Reserved | Message_Length(0:7) |

FIG. 2

| Word | Byte0 | Byte1 | Byte2 | Byte3 |
|---|---|---|---|---|
| 0 | D_Buf_Adr(0:31) | | | |
| 1 | D_Buf_Adr(32:35) ‖ '0000' | Format(0:7) | Msg_Buf_Index(0:7) | R_Buf_Index(0:7) |

FIG. 3

| Word | Byte0 | Byte1 | Byte2 | Byte3 |
|---|---|---|---|---|
| 0 | R_Buf_Adr(0:31) | | | |
| 1 | R_Buf_Adr(32:35) ‖ '0000' | Message_Tag(0:7) | Format(0:7) | Reserved |
| | Message byte 0 | Message byte 1 | Message byte 2 | Message byte 3 |
| .. | .. | .. | .. | .. |
| Last | Message byte n-3 | Message byte n-2 | Message byte n-1 | Message byte n |

FIG. 4

SENDING THREAD MESSAGE GENERATED USING DCR COMMAND POINTED MESSAGE CONTROL BLOCK STORING MESSAGE AND RESPONSE MEMORY ADDRESS IN MULTIPROCESSOR

BACKGROUND OF THE INVENTION

The present invention relates to multi-processor computing systems which exchange messages between processors/co-processors. Specifically, the invention is directed to processors which execute multiple threads where each thread can request the services of a co-processor for executing a sub-set of instructions to obtain data needed to finish execution of a thread.

Advances in computing systems have resulted by executing a program using distributed computation among a plurality of processors. In these multiple processor systems, one processor may begin executing a thread of instructions which requires additional information which is obtained from a linked co-processor. This requires a messaging protocol to invoke the co-processor to execute a set of dedicated instructions and to forward the results of the co-processor so that execution may continue.

An additional benefit of using linked multi-processors results when one of the processors is executing multiple threads of an execution sequence of the same program. By using the multi-thread processing system, it is possible when one thread is waiting for data from a co-processor to continue processing by executing other threads of the program. Thus, by declaring many threads within the confines of a single program, a parallelism is achieved which ultimately improves the overall processing speed for the program.

The performance of a multi-processor system, however, depends on a number of factors, such as the flow control of information between processors, scheduling of requests to a co-processor, and the time to setup and tear down connections between processors and co-processors. In a multi-processor/multi-thread environment, messaging between processors becomes even more complicated. Each thread in a multi-threaded processor must be aware of its own thread identity, at least to the extent that different index registers for each thread would have to be initialized for each thread to access thread specific data. Each thread would have to set-up independent Direct Memory Access (DMA) or message control blocks (MCB) since each thread requires private message buffers and response buffers. The duplication of message control blocks for each thread requires a significant increase in local high-speed memory for each processor. Additionally, the specific thread requesting services from a co-processor must be notified when the result is received, so that execution of the thread may proceed. The complications of a multi-thread execution which relies upon another processor for support are alleviated by the messaging protocol of the present invention.

SUMMARY OF THE INVENTION

A system and method is provided for messaging between system processors which are interconnected by a system bus. In accordance with the invention, a system processor executes multiple threads within the same process. System memory is provided having both shared and dedicated memory for each of the processed threads. Communication between a thread and a co-processor connected via the system bus is effected by message control blocks for each co-processor. The message control block identifies the physical address of the co-processor, a memory return address for a response from the co-processor and a memory location of the message to be sent.

When the execution of a thread creates a request for service from a co-processor, the system processor creates a Device Control Register (DCR) command which has a pointer identifying a message control block for the target co-processor. The message to be sent to the co-processor is built in system memory at an address specified by the message control block. The built message includes the data payload as well as the data identifying the return address in the system memory for response data returned from the co-processor. A DMA controller is responsive to the DCR command, and obtains a connection over the system bus to the target co-processor. Once the connection is set-up, the message is sent to the co-processor.

The message sent to the co-processor includes a return address concatenated with the processing thread number by the DMA controller. The response message returned from the co-processor includes the return address and concatenated thread number. In this way, the system processor knows where in memory to store the return message, and is able to identify and wake-up the idling thread to allow it to continue processing.

The invention avoids having to duplicate the message control blocks for each thread which may request service from the same co-processor, and it is possible to clearly identify a return message with the requesting thread. A wake-up indication is embedded in the return message to wake-up the requesting thread for subsequent processing.

DESCRIPTION OF THE PREFERRED EMBODIMENT

FIG. 2 is an illustration of the message control block stored in the system processor shared memory;

FIG. 3 illustrates the message command format used by the DMA controller to build a message for transmission to the target processor; and FIG. 4 illustrates the message format created by the DMA controller for transmission to the co-processor.

DETAILED DESCRIPTION OF THE INVENTION

Figure 1:
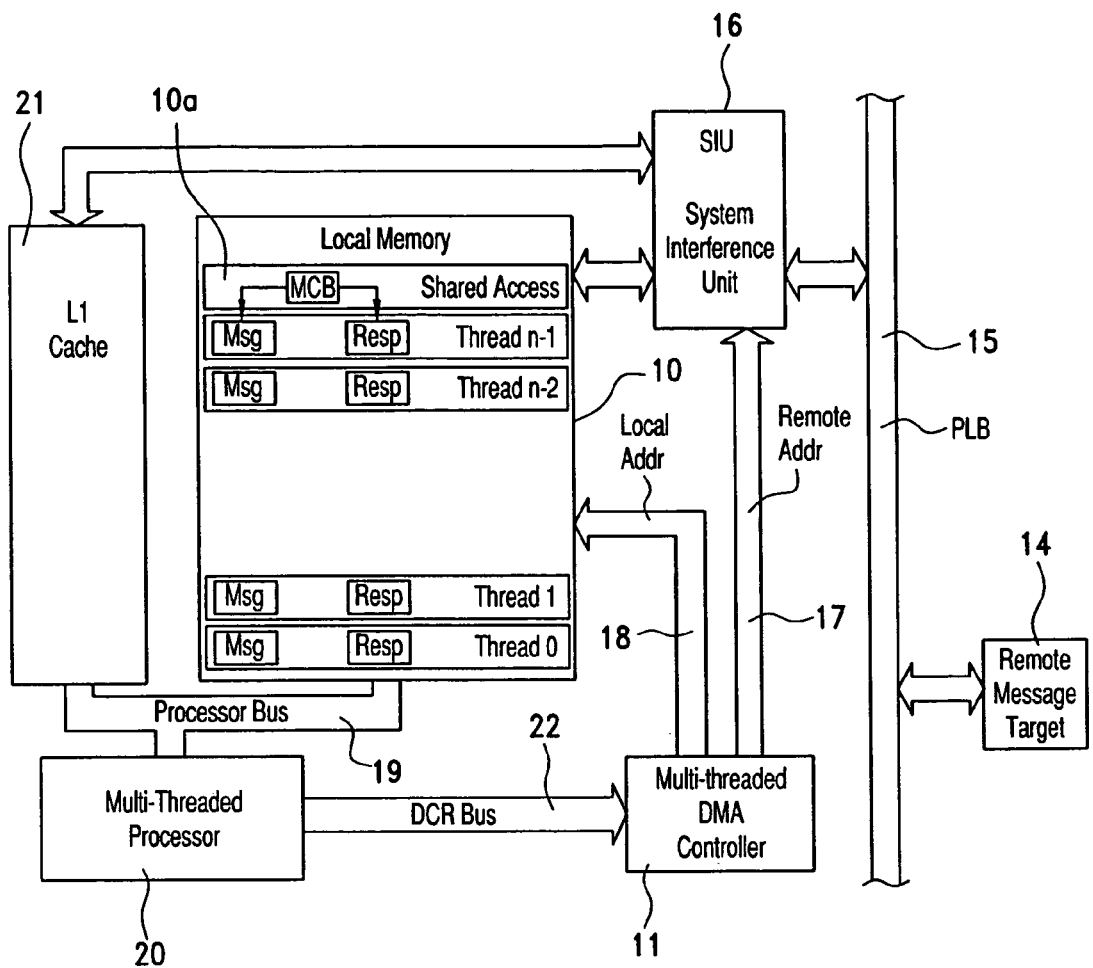
FIG. 1 is a block diagram illustrating the processor components used to communicate with a remote target processor.

Referring now to FIG. 1, a multi-threaded processor 20 is shown which executes an application program. Instructions for execution and data for processing are loaded in the L1 cache 21 from an L2 cache, which is not shown, associated with the system interface unit SIU 16. Main memory, which is not shown, is connected to SIU 16 via PLB 15, and supplies data to the L2 cache, and subsequently to the L1 cache. It should be understood that although a single L1 cache is illustrated, actual implementation may include separate L1 caches for instructions and data. Local memory 10 provides the multi-threaded processor 20 with storage locations which are both dedicated to each thread being executed by the multi-threaded processor as well as storage space shared by all threads. When the multi-threaded processor 20 executes an instruction which requires information derived from a remote co-processor 14, it builds the message payload for a transmission in an appropriate message buffer within memory 10, which may be dedicated to the particular thread requesting the service over internal bus 19. The creation of a message for transfer to the remote target co-processor 14 is initiated by the move to DCR instruction. In response to execution of the DCR instruction, a "move to DCR" command is then issued by hardware over the DCR bus 22 to the DCR register in DMA controller 11. The DMA controller 11 creates a message based on the move to DCR instruction in the DCR register of the multi-threaded DMA controller 11 by appending fields from the DCR command and from the Message Control Block pointed to by the DCR command as will be described below.

Referring now to FIG. 2, the move to DCR command format is illustrated. A message control block (MCB) index field defines an offset into a shared region of local memory 10a containing the message control block (MCB) for a target processor or coprocessor. A message tag field (message-tag (0:7)) associates the message with a specific busy bit, and the message length (message-length (0:7)) defines the length of transfer for the message. The thread number requesting the message is not explicitly stated in the command, but the thread number is known by the processor based on the thread executing the instruction that executes the move to DCR command. In accordance with the invention, the requesting thread number is as will be evident later, appended to message addresses to clearly define where a response message is to be sent and where the message payload is stored in the private memory for the requesting thread.

The address of the message target processor or co-processor 14 is determined from a message control block (MCB) stored in the shared memory portion 10a of memory 10 which has the form generally of FIG. 3, where two entries, D buff ADR (0:31) in word 0, bytes 0-3 and D buff ADR (32:35) in word 1, byte 0 are concatenated to form the system physical address for the target processor co-processor 14. Byte 1 of word 1 identifies the format of the message which is to be sent to the target co-processor. Byte 2 of word 1 includes a message buffer index (0:7) which is a partial address in the dedicated thread storage area of the message payload system memory 10b where the message payload resides. The remaining address bits for the payload are the thread number originating the message, and identify which thread storage area is to be addressed. The thread number is concatenated to the message buffer index at the time the message is constructed.

Byte number 3 of word 1 is an index into the thread memory location constituting a partial address R_Buf_Index (0:7) of the response buffer where the response message from the co-processor is to be stored. Additional address bits for the response message buffer are the thread number originating the message, and identify which thread storage area is to be addressed. The remaining address bits for the response buffer represent the system address of the processor 20 originating the request. The system address, thread number, and R_Buf_Index are concatenated to form a fully specified address for a response message. This response message address is added to a corresponding response message by the co-processor when the response message is forwarded to the system processor 20 so that the correct, dedicated memory portion is located.

Thus, the message control block has an index that can identify the location in dedicated thread memory of message payloads to be transmitted, and an index for the location of response messages without being thread specific. At the time the message is created, the processor knows which thread has requested the message to be sent, and the thread number and configured system address, representing the additional address bits, can be used to complete both the address of the message payload being sent as well as the location for storing the response. This allows a single message control block to be used by all threads to access the same target processor. Note that the system address is not required to access the message payload, since it is only accessed by local devices (e.g. within the address domain of processor 20), but the system address is required to define a return path of the response message, since the target processor or coprocessor 14 is outside of the address domain of processor 20.

The DMA controller creates a message for transmission having a format and control wrapper shown in FIG. 4. Referring now to FIG. 4, the message includes the buffer address R-Buf_Adr (0:31) and R-Buf_Adr (32:35) for the response message constructed from R_Buf_Index, thread number, and system address as described above. The message also includes a message tag which indicates the busy bit which can represent the thread initiating the message transfer. The message format, which is derived from the message control block, is followed with the message bytes constituting the payload read from local memory 10, as addressed by the Msg_Buf_Index of the message control block (MCB) concatenated with the requesting thread number. For example, the Msg_Buf_Index in the message control blocks may consist of the following binary bits: "0TTTPPPPP-PPP00", where the three T bits are loaded with 0. However, the DMA controller can overlay the T bits with the thread number. Thus, the message control block message buffer index Msg_Buf_Index will point to a location in the private memory space, and the thread number will identify the private thread memory space containing the location. The two least significant bits can always be 0 when the processor is setup to fetch 4 bytes at a time. The most significant bit is 0 which selects thread specific memory, as opposed to shared memory which is accessible by all threads.

The message of FIG. 4 created by the DMA controller 11 is transferred over the PLB bus 15 through the system interface unit 16. The target co-processor 14 is identified by D_Buf_Address from the MCB, and receives the message, and parses the message to obtain information necessary for servicing the request and transferring the results back to the system processor 20.

Message target processor or co-processor 14 determines the address to send the response message from the R_Buf_Adr address information contained in the received message. Further, the Message Tag identifies the busy bit which is associated with the message which is used by the processor to identify the requesting thread. The format defines the message length and any other message details necessary to parse the different bytes into information for the target processor or co-processor 14. When the request has been serviced by the target processor or co-processor 14, a message is configured having a target address corresponding to the R_Buf_Adr address contained in the requesting message of the multi-thread processor 20.

The target processor or co-processor 14 generates a return message address which includes the R_Buf_Adr obtained from the message of FIG. 4 concatenated with the requesting thread number. When the target processor or co-processor 14 obtains access to the bus 15, the response message is transferred to the node having the multi-thread processor 20 as determined by the system address bits of the return message address. The DMA controller recognizes the incoming message as having an address corresponding to a private thread memory location 10. Thus, the received message has a full address which is recognized by the DMA controller.

The message type contained in the response message is equivalent to the message tag which was sent in the message. The system interface unit monitors the bus, and when it recognizes an address which contains the message tag of the message sent from the system interface unit it notifies the originating thread of processor 20.

The result is that the thread which initiated the message in the multi-threaded processor 20 wakes up, and looks for a message in its private memory which was identified by the message control block as a location for the response message. The DMA controller reactivates execution of the requesting thread using the message tag and thread number which is identified by the location in local memory where the response message has been stored. The thread is activated and continues processing of its instructions under control of the processor scheduling routine and the requested data is used during processing of the thread.

The foregoing messaging system requires a method of flow control, as it is possible that a co-processor could be busy and not be able to handle the incoming message request. As a solution to this problem, the message transmitter receiver pair may simply reserve hardware resources in the receiver for the exclusive use of the transmitter, so that if a transmitter tracks the number of outstanding or unanswered request messages to any receiver, it can determine whether or not the receiver has the resources to accept another message.

As an alternative to reserving hardware in the receiver in each potential source of request messages, a different type of flow control may be implemented. In another system of flow control, it would be possible for each target processor to notify other nodes on the bus that it cannot accept anymore messages. At the time that the target processor can accept the message, it can so inform all the nodes on the bus.

The foregoing description of the invention illustrates and describes the present invention. Additionally, the disclosure shows and describes only the preferred embodiments of the invention in the context of a system and method for exchanging messages in a multi-processor environment, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed as new and desired to be protected by Letters Patent of the United States is:

1. A method for messaging between system processors and co-processors connected by a system bus comprising:
    storing a Message Control Block (MCB) in memory prior to system operation for each processor or co-processor connected to said system bus, said MCB identifying the physical address of said processor or co-processor, a memory location address for a response from said processor or co-processor to be stored, and a memory location of a message to be sent;
    creating a move to Device Control Register (DCR) command having a DCR pointer identifying said MCB;
    building a message for transfer to said processor or co-processor in memory at an address specified by said MCB, said message including said return address for a response message to be stored and having format information for said outgoing message;
    accessing with a Direct Memory Access (DMA) controller the MCB from the DCR command pointer; and
    sending the message identified in said MCB to said processor or co-processor.

2. The method for messaging between system processors and co-processors connected by a system bus according to claim 1, further comprising:
    receiving from said bus a response message sent by said processor or co-processor;
    storing said response message in said memory location specified in said outgoing message.

3. The method for messaging according to claim 2, further comprising:
    providing message tag in said outgoing message for identifying a busy bit associated with said outgoing message; and
    detecting said busy bit in a response message which activates processing of said response message.

4. The method according to claim 1, further comprising:
    providing an execution thread number as part of the address of said response message; and
    activating a corresponding execution thread when said response message is received.

5. The method according to claim 1, wherein said message is created in a memory location specific to a processing thread which requests transmission to said processor or co-processor.

6. The method according to claim 5, further comprising concatenating with said memory return address in said Message Control Block (MCB) a thread number corresponding to said requesting thread.

7. The method according to claim 1, wherein said message is created with a message tag in said DCR command which is used to activate a processing thread when a response message is received.

8. The method according to claim 1, wherein said Message Control Block (MCB) is located in a shared memory shared by a plurality of threads being executed by a system processor.

9. The method according to claim 8, wherein said Message Control Block (MCB) includes a partial address for said memory location for a message to be sent identifying a location within a private memory storage area for a thread requesting access to said processor or co-processor.

10. The method according to claim 9, wherein a return message from said processor or co-processor identifies said requesting thread in said response so that said private memory storage area may be identified.

11. A messaging system for a system processor which, during execution of programming code, requests the services of one or more processors or co-processors interconnected by a system bus, comprising:
    a system processor memory for storing a Message Control Block (MCB) for each processor or co-processor connected to said system bus, said MCB identifying the physical address of said processor or co-processor, a memory return address for a response from said processor or co-processor, and a memory location of a message to be sent;
    said system processor initiating transmission of said message by executing the steps of:

creating a move to Device Control Register (DCR) command having a pointer identifying a MCB of a target processor or co-processor;

building said message in said system memory at an address specified by said MCB, said message including said return address for a response message to be stored and having format information for said message to be sent; and a Direct Memory Access (DMA) controller responsive to the command transmitting said message over said system bus.

12. The messaging system according to claim 11, wherein said DMA controller concatenates a processing thread number to said return address whereby said return message can be stored in memory accessible by a processing thread which requests said information from said processor or co-processor.

13. The messaging system according to claim 11, wherein said Message Control Blocks are stored in memory space shared by a plurality of processing threads.

14. The messaging system according to claim 11, wherein said system memory is partitioned into a shared memory section whereby all threads executing in a system processor may have access to said shared memory section, and into private memory sections for each thread.

15. The messaging system according to claim 14, wherein said Message Control Block (MCBs) are stored in shared memory and are accessible by all of said threads.

16. The messaging system according to claim 15, wherein said Message Control Block (MCBs) identify the location within said private memory sections for a message to be built, and a location in said private memory section for said response message.

17. The messaging system according to claim 16, wherein a thread number of a requesting thread identifies which private memory section contains said message to be built and said location for said response message.

* * * * *